(12) United States Patent
Fortune et al.

(10) Patent No.: US 6,912,920 B2
(45) Date of Patent: Jul. 5, 2005

(54) FRAME-BASED OCCUPANT WEIGHT ESTIMATION LOAD CELL WITH BALL-ACTUATED FORCE SENSOR

(75) Inventors: Duane D. Fortune, Lebanon, IN (US); Morgan D. Murphy, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/631,156

(22) Filed: Jul. 31, 2003

(65) Prior Publication Data

US 2005/0022615 A1 Feb. 3, 2005

(51) Int. Cl.⁷ .............................. G01L 1/00; G01L 1/22
(52) U.S. Cl. ........................ 73/862.044; 73/862.045; 73/862.382
(58) Field of Search .................. 73/862.382, 862.044, 73/862.045, 862.01, 862.381, 862.474, 862.627; 177/211

(56) References Cited

U.S. PATENT DOCUMENTS

| | | | |
|---|---|---|---|
| 3,915,248 A | 10/1975 | Paelian | |
| 5,474,327 A | 12/1995 | Schousek | |
| 5,942,695 A | * 8/1999 | Verma et al. | ................. 73/768 |
| 5,987,370 A | 11/1999 | Murphey et al. | |
| 6,012,007 A | 1/2000 | Fortune et al. | |
| 6,058,341 A | 5/2000 | Myers et al. | |
| 6,101,436 A | 8/2000 | Fortune et al. | |
| 6,138,067 A | 10/2000 | Cobb et al. | |
| 6,246,936 B1 | 6/2001 | Murphey et al. | |
| 6,264,352 B1 | 7/2001 | Zapinski | |
| 6,360,618 B2 | 3/2002 | Anahid et al. | |
| 6,424,898 B2 | 7/2002 | Anishetty et al. | |
| 6,438,476 B1 | 8/2002 | Gray et al. | |
| 6,438,477 B1 | 8/2002 | Patterson et al. | |
| 6,479,776 B2 | 11/2002 | Nakase et al. | |
| 6,542,802 B2 | 4/2003 | Gray et al. | |
| 6,578,871 B2 | 6/2003 | Gray et al. | |
| 6,587,770 B1 | 7/2003 | Gray et al. | |
| 2003/0213623 A1 | * 11/2003 | Axakov et al. | ............. 177/229 |

FOREIGN PATENT DOCUMENTS

WO   03/071246   8/2003

OTHER PUBLICATIONS

European Search Report dated Nov. 8, 2004.

* cited by examiner

*Primary Examiner*—Max Noori
*Assistant Examiner*—Lilybett Martir
(74) *Attorney, Agent, or Firm*—Stefan V. Chmielewski

(57) ABSTRACT

A seat frame-based occupant weight estimation load cell transfers the seat force to a floor bracket through a spherical ball and a ball actuator. The ball is in contact with the force sensor and has minimal contact area with either the ball actuator or the force sensor so that the transfer of forces not functionally related to occupant weight is minimized. The ball actuator is coupled to the seat frame, and a sensor bracket aligns the ball actuator with respect to the sensor. The sensor bracket is domed to securely anchor the seat to the floor bracket in the event of an inverse overload. A spring disposed between the ball actuator and the dome of the sensor bracket biases the ball against the force sensor to preload the force sensor for enabling off-loading detection.

5 Claims, 2 Drawing Sheets

US 6,912,920 B2

FRAME-BASED OCCUPANT WEIGHT ESTIMATION LOAD CELL WITH BALL-ACTUATED FORCE SENSOR

TECHNICAL FIELD

This invention is directed to apparatus for detecting the weight of an occupant of a motor vehicle seat for purposes of determining whether and how forcefully to deploy supplemental restraints, and more particularly to a load cell for measuring forces applied to a frame of the vehicle seat.

BACKGROUND OF THE INVENTION

Vehicle occupant detection systems are useful in connection with air bags and other pyrotechnically deployed restraints as a means of judging whether, and how forcefully, to deploy the restraint. One fundamental parameter in this regard is the weight of the occupant, as weight may be used as a criterion to distinguish between an adult and an infant or small child.

Most prior weight estimation techniques involve installing a pressure sensitive element such as a variable resistance pad or a fluid filled bladder in or under a vehicle seat cushion, and utilizing the pressure measurement as an indication of occupant weight. See, for example, the U.S. Pat. Nos. 5,474,327, 5,987,370, 6,246,936, 6,101,436 and 6,490,936, assigned to the assignee of the present invention and incorporated by reference herein.

Alternatively, the occupant weight may be measured with one or more load cells that sense the forces (strain or pressure) that the seat applies to a bracket that supports the seat on the vehicle floor. See, for example, the Publication Nos. 41520, 41542, 41549 and 41559 from the November, 1998 issue of Research Disclosure. In most applications, the load cells utilize one or more strain gauge elements for sensing the vertical or z-axis force applied through the load cell due to occupant weight. One of the problems encountered with this approach is that strain gauge elements also tend to be sensitive to bending or cross-axis forces that are not functionally related to occupant weight. The bending or cross-axis forces can occur, for example, when the adjoining surfaces of the load cell and the sensor are mismatched, or when the seat applies a twisting force to the load cell. In any event, the presence of such twisting or cross-axis forces tends to corrupt the z-axis force measurement, leading to inaccurate occupant weight estimation. Accordingly, what is needed is a seat frame load cell that applies z-axis forces to a strain gauge sensor while minimizing the effects of forces that are not functionally related to occupant weight.

SUMMARY OF THE INVENTION

The present invention is directed to an improved seat frame-based occupant weight estimation load cell that transfers the seat force to a floor bracket through a spherical ball and a ball actuator. The ball is in contact with the force sensor and has minimal contact area with either the ball actuator or the force sensor so that the transfer of forces not functionally related to occupant weight is minimized. In the preferred embodiment, a ball actuator is coupled to the seat frame, and a sensor bracket aligns the ball actuator with respect to the sensor. The sensor bracket is preferably domed to securely anchor the seat to the floor bracket via the ball actuator in the event of an inverse overload. A spring disposed between the ball actuator and the dome of the sensor bracket biases the ball against the sensor to preload the sensor for enabling off-loading detection.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
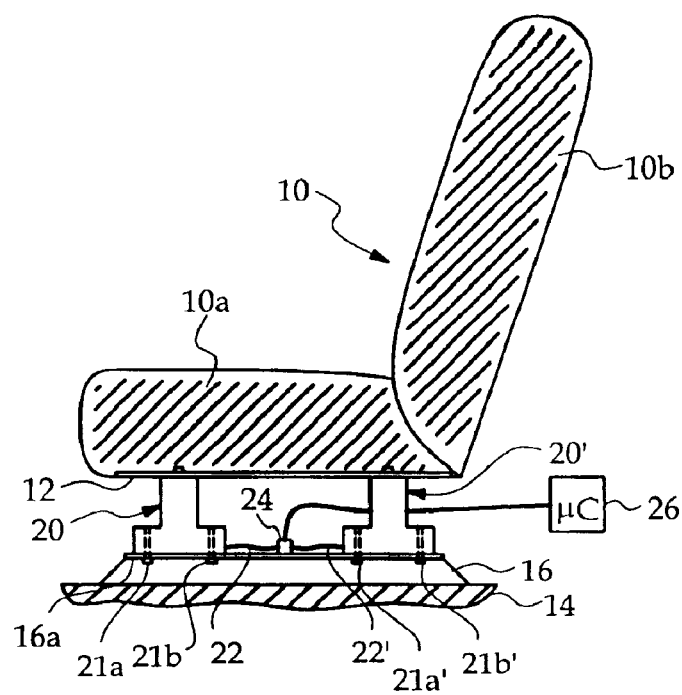
FIG. 1 is a side-view diagram of a vehicle seat incorporating the frame-based occupant weight estimation apparatus of the present invention.

Referring to the drawings, and particularly to FIG. 1, the reference numeral 10 generally designates a vehicle seat, including seat and backrest cushions 10a, 10b supported on a metal frame 12. The seat 10 is secured to the vehicle floor 14 by a pair of laterally spaced floor brackets 16, only one of which is shown in FIG. 1. The floor bracket 16 is bolted to floor 14, and a set of load cells 20, 20' are interposed between the seat frame 12 and the floor bracket 16 for supporting the seat 10 and estimating the weight of a seat occupant. In the illustrated embodiment, the floor bracket 16 includes an integral flange 16a, and the load cells 20, 20' are secured to the floor bracket 16 by a set of bolts 21a, 21b; 21a', 21b' that seat against flange 16a. The load cells 20, 20' produce electrical outputs on lines 22, 22' indicative of the forces transmitted therethrough; the lines 22 and 22' are coupled to a connector 24, which in turn is electrically coupled to a microcontroller (uC) 26, which may be located beneath the seat 10 or at a remote location. The microcontroller 26 processes the output signals produced by the various load cells 20, 20' to determine corresponding weights attributable to a seat occupant, and sums the weights to determine the occupant weight or weight classification for purposes of deciding whether and how forcefully to deploy supplemental restraints designed to protect the occupant from serious injury in a crash event.

In a typical mechanization, there are four load cells (left front, right front, left rear and right rear); however, only the left-front and left-rear load cells 20, 20' are visible in FIG. 1. Since the various load cells 20, 20' are identical, the following description of the load cell 20 applies equally to load cell 20' as well as the right-front and right-rear load cells.

The load cell 20 includes a force sensor 28 such as a strain gauge for measuring the force transmitted through the load cell and producing an electrical output signal functionally related to such force. Suitable force sensors are produced and sold by Panasonic Corporation or Texas Instruments Corporation, for example. As explained above, twisting or cross-axis forces are not functionally related to occupant weight and tend to corrupt the vertical or z-axis force measurement, leading to inaccurate occupant weight estimation. In each of the three load cell embodiments described below, the effects of twisting or cross-axis forces are minimized by coupling the seat 10 to force sensor 28 through a spherical ball 30. The ball 30 minimizes the loading contact area with the force sensor 28 so that the transfer of forces not functionally related to occupant weight is minimized. In each of the embodiments, a ball actuator 32 is coupled to the seat frame 12, and a sensor bracket 34 aligns the ball actuator 32 with respect to the force sensor 28. Additionally, the sensor bracket 34 is domed to securely anchor the seat 10 to the floor bracket 16 via the ball actuator 32 in the event of an inverse overload (as can occur in a crash event). Also, a spring 36 disposed between the ball actuator 32 and the dome of the sensor bracket 34 preloads the force sensor 28 to enable off-loading detection. Off-loading can occur, for example, when the occupant leans back in the seat 10, reducing the force measured by the force sensors coupled to the front of the seat 10. Due to the preload force, such off-loading can be measured and taken into consideration in the weight estimation calculations.

Figure 2:
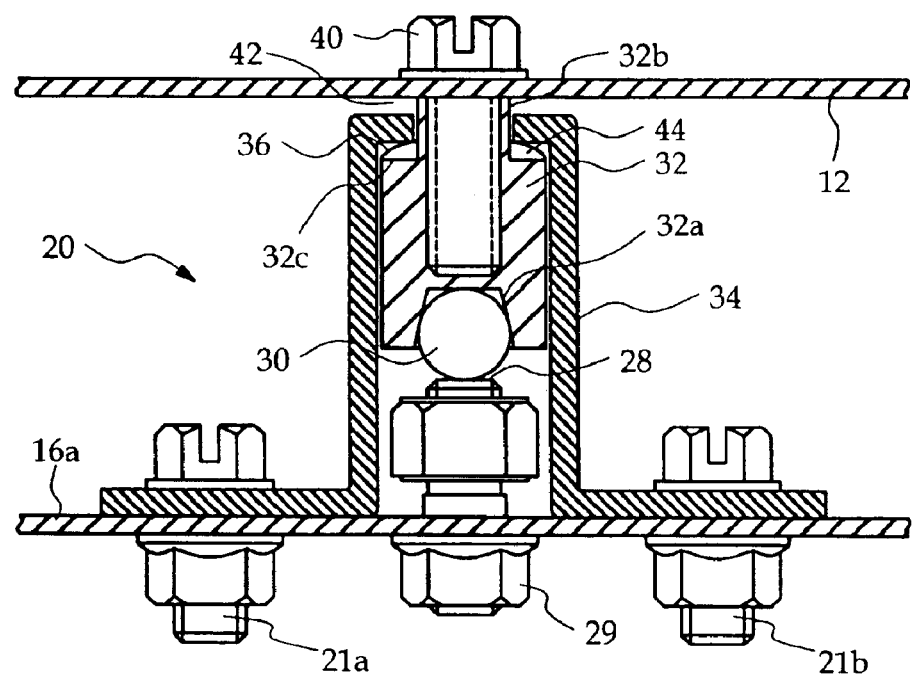
FIG. 2 is a sectional view of the weight estimation apparatus of FIG. 1 according to a first embodiment of this invention.

In the embodiment of FIG. 2, the force sensor 28 is in the form of a bolt that is mechanically secured to the floor bracket flange 16a by the nut 29. The sensor bracket 34 is separately bolted to the flange 16a by the bolts 21a, 21b, and is domed around the sensor 28 in the area between flange 16a and the seat frame 12. The ball 30 is also disposed within the domed portion of the sensor bracket 34, and is axially aligned with the working surface of the sensor 28 by a conical recess 32a formed in the inboard end of ball actuator 32. The narrowed outboard end 32b of ball actuator 32 extends through a central aperture in the domed portion of sensor bracket 34, and a bolt 40 threaded axially into the ball actuator 32 secures the ball actuator 32 to the seat frame 12. A space 42 between the seat frame 12 and the sensor bracket 34 permits limited downward movement of the seat frame 12 with respect to the floor bracket 16, and a space 44 between the shoulder 32c of ball actuator 32 and the domed portion of sensor bracket 34 permits limited upward movement of the seat frame 12 with respect to the floor bracket 16. The spring 36 is disposed in the space 44 between ball actuator shoulder 32c and sensor bracket 34 to bias the ball 30 against the working surface of the force sensor 28 to preload the force sensor 28.

Figure 3:
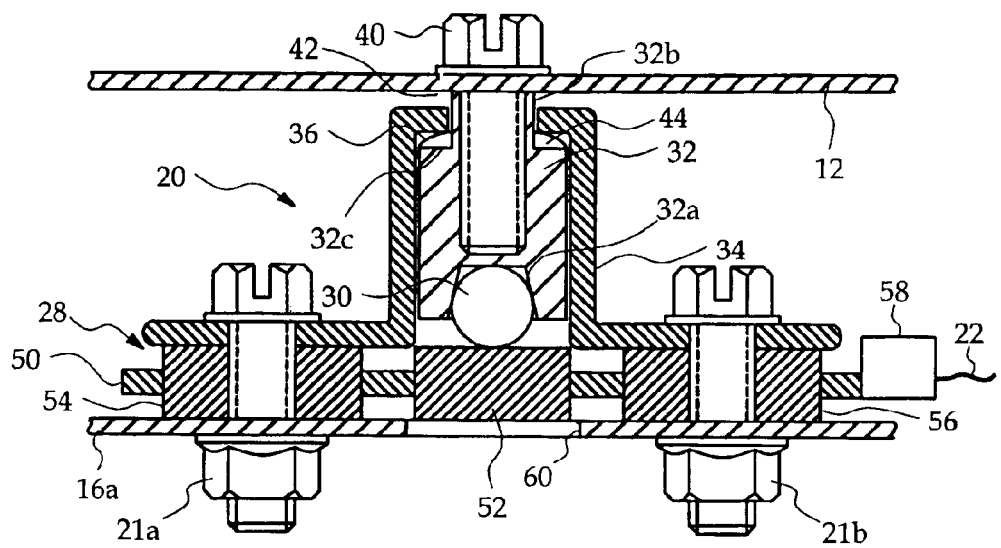
FIG. 3 is a sectional view of the weight estimation apparatus of FIG. 1 according to a second embodiment of this invention.
Figure 4:
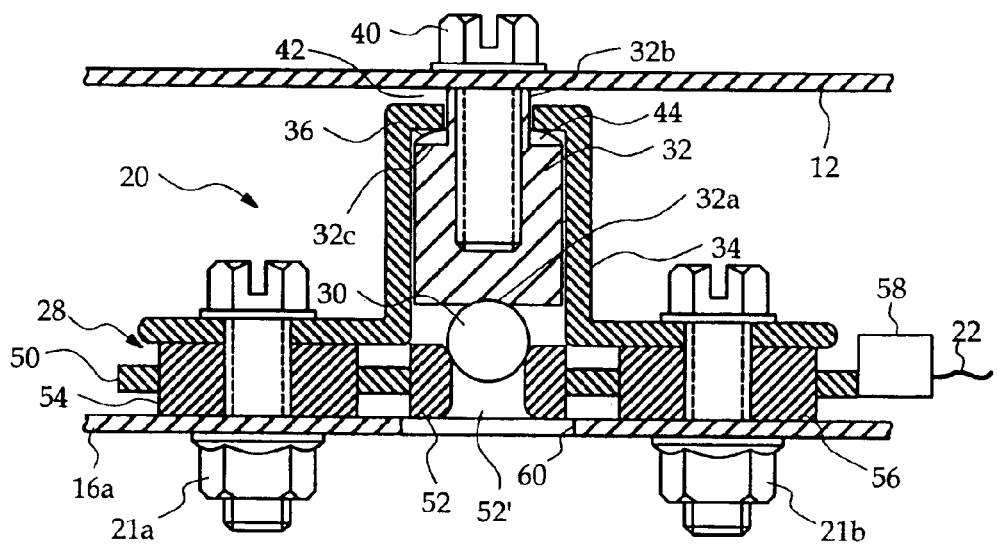
FIG. 4 is a sectional view of the weight estimation apparatus of FIG. 1 according to a third embodiment of this invention.

In the embodiments of FIGS. 3 and 4, the force sensor 28 comprises an elongated metal plate 50 that captures a series of three grommets or inserts 52, 54, 56. The outer grommets 54 and 56 are retained between the sensor bracket 34 and the floor bracket flange 16a by the bolts 21a and 21b, respectively, and ball 30 contacts the central grommet 52. An aperture 60 formed in the floor bracket flange 16a permits downward movement of the grommet 52 with respect to the floor bracket 16. Alternatively, grommet 52 could be made in such a way as to provide sufficient clearance between it and the floor bracket flange 16a, in which case the aperture 60 could be eliminated. The movement of grommet 52 stresses the plate 50, and strain gauge elements (not shown) formed on a surface of plate 50 surrounding the grommet 52 are coupled to an electrical module 58 where the sensor outputs are measured and conditioned to form a weight-representative signal that is coupled to connector 24 by line 22 as indicated in FIG. 1.

In the embodiment of FIG. 3, the central grommet 52 is not apertured, and the ball 30 is biased against the flat upper surface of the central grommet 52 by a ball actuator 32 having a conical recess 32a, as in the embodiment of FIG. 2. In the embodiment of FIG. 4, the central grommet 52 has an aperture 52', and the ball 30 is seated in the upper or inboard periphery of the aperture 52'; in this case, the aperture 52' laterally aligns the ball 30, and the surface 32a of ball actuator 32 that contacts ball 30 is substantially planar or slightly concave as shown. In other respects, the load cells 20 of FIGS. 3 and 4 are similar to the load cell 20 of FIG. 2, and are not described further herein.

In summary, the present invention provides a seat frame-based occupant weight estimation apparatus that transfers the seat force to a floor bracket 16 through a force sensor 28 and a spherical ball 30 that is biased into engagement with the force sensor 28 by a spring 36 and ball actuator 32. The ball 30 has minimal contact area with either the ball actuator 32 or the force sensor 28 so that the transfer of forces not functionally related to occupant weight is minimized. In the event of an inverse overload that tends to separate the seat 10 from the floor bracket 16, the ball actuator 32 contacts the domed portion of the sensor bracket 34, preventing further upward movement of the seat frame 12 with respect to the floor bracket 16.

While described in respect to the illustrated embodiments, it will be recognized that various modifications in addition to those mentioned above may occur to those skilled in the art. For example, the seat 10 may be supported by a greater or lesser number of load cells, the load cells may be inverted relative to the illustrated embodiments, and so on. Accordingly, it will be understood that systems incorporating these and other modifications may fall within the scope of this invention, which is defined by the appended claims.

What is claimed is:

1. Apparatus for estimating the weight of an occupant of a vehicle seat having a seat frame supported by a floor bracket, the apparatus comprising:

a force sensor secured with respect to said floor bracket;

a spherical ball in contact with the force sensor;

a ball actuator coupled said seat frame and contacting a surface of said ball opposite said force sensor;

a sensor bracket secured with respect to said floor bracket and having a domed portion that aligns said ball actuator with respect to said sensor, said domed portion having a central aperture through which a neck portion of said ball actuator extends such that interference between said ball actuator and said domed portion in the event of inverse seat loading limits movement of said seat frame with respect to said floor bracket; and a spring for preloading said force sensor by biasing said ball against said force sensor.

2. The apparatus of claim 1, wherein said spring is disposed between said ball actuator and the domed portion of said sensor bracket.

3. The apparatus of claim 1, wherein said ball actuator includes a conical recess that is aligned with said sensor, and said ball is partially received in said recess to align said ball with said sensor.

4. The apparatus of claim 1, wherein said sensor includes an aperture, said ball is seated on said sensor about said aperture, and said ball actuator has a substantially planar surface that contacts said ball.

5. The apparatus of claim 1, wherein the apparatus is inverted such that said ball actuator is secured with respect to said floor bracket, and said force sensor and said sensor bracket are coupled to said seat frame.

* * * * *